United States Patent [19]

Hagiwara et al.

[11] Patent Number: 5,090,744
[45] Date of Patent: Feb. 25, 1992

[54] FLEXIBLE PIPE JOINT SYSTEM

[75] Inventors: Takanobu Hagiwara; Katsuhiko Hatta; Isao Watanabe, all of Yokohama, Japan

[73] Assignee: Yokohama Aeroquip Co., Tokyo, Japan

[21] Appl. No.: 612,375

[22] Filed: Nov. 14, 1990

[30] Foreign Application Priority Data

Nov. 16, 1989 [JP] Japan .................. 1-132567

[51] Int. Cl.⁵ ............................................. F16L 27/06
[52] U.S. Cl. ..................... 285/166; 285/168; 285/181; 285/281
[58] Field of Search ............... 285/281, 163, 164, 166, 285/168, 181

[56] References Cited

U.S. PATENT DOCUMENTS

| | | | |
|---|---|---|---|
| 424,468 | 4/1890 | Dart | 285/16 X |
| 1,016,620 | 2/1912 | Gapp | 285/16 X |
| 2,058,124 | 10/1936 | Bard et al. | 285/166 X |
| 3,053,553 | 9/1962 | Browning | 285/31 |
| 4,484,634 | 11/1984 | Swanson et al. | |

FOREIGN PATENT DOCUMENTS 641125 8/1950 United Kingdom ................ 285/281
734712 8/1955 United Kingdom ................ 285/281

*Primary Examiner*—Randolph A. Reese
*Assistant Examiner*—Heather Chun
*Attorney, Agent, or Firm*—Sughrue, Mion, Zinn, Macpeak & Seas

[57] ABSTRACT

A flexible pipe joint system has three swivel joints on the both sides and in the central portion thereof, and two arm pipes connecting the swivel joints. The swivel joints have a stepped cylinder body, an elbow and a cap nut. The stepped cylinder body has a larger diameter portion and a smaller diameter portion. The elbow has a pipe connection portion to which a nipple provided with a flange on its outer end and a nut member on its outer periphery. A short cylindrical adapter is provided at one end of the arm pipe connected to the pipe connection portion of the elbow and to one end of the arm pipe connected to the smaller diameter portion of the cylinder body. The adapter and the nut member, respectively, have an outer diameter smaller than the inner diameter of the gasket and an inner diameter of an end portion of the cap nut.

4 Claims, 3 Drawing Sheets

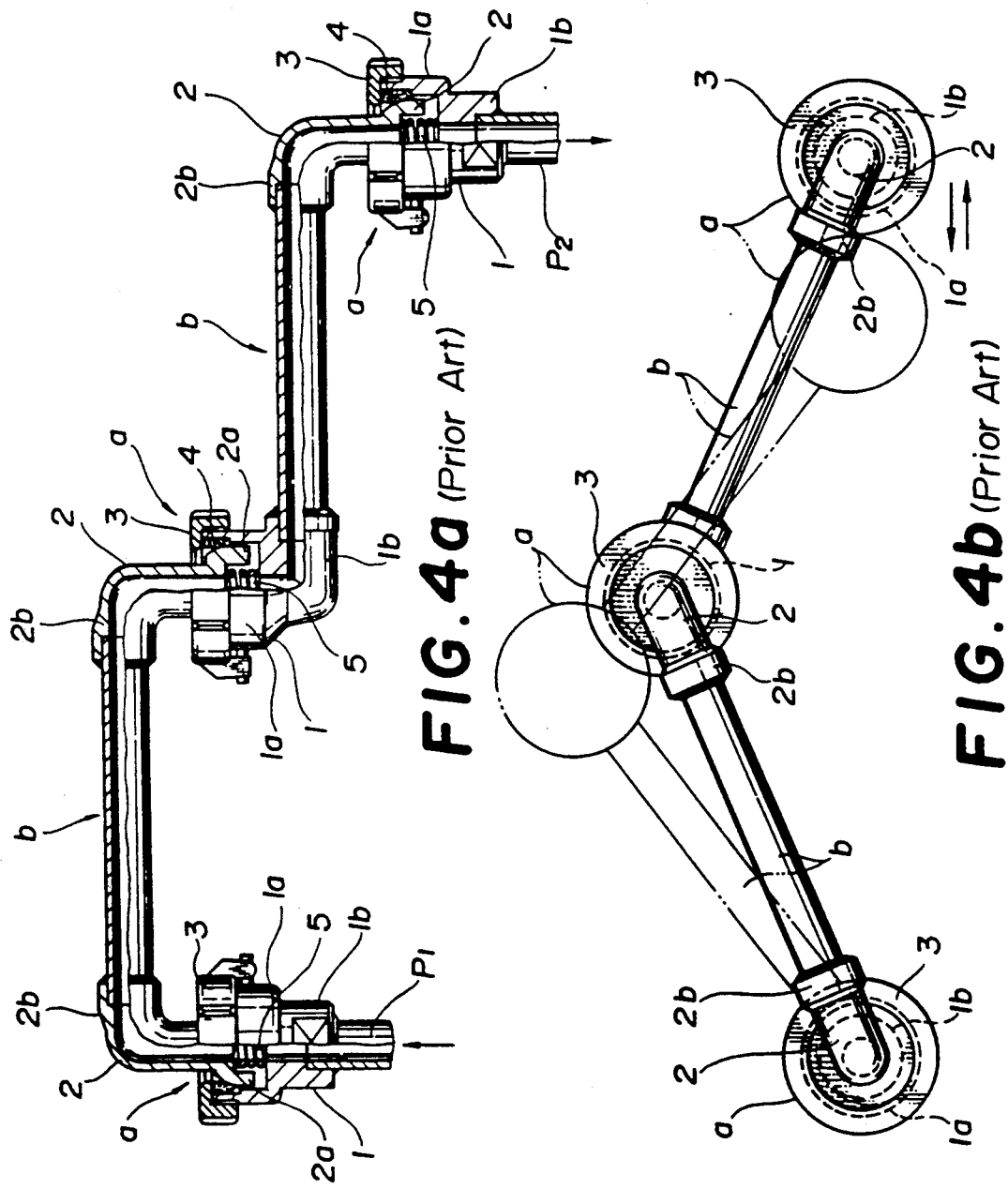

FLEXIBLE PIPE JOINT SYSTEM

BACKGROUND OF THE INVENTION

1. Field of the Invention

The present invention relates to a flexible pipe joint system for supplying desired fluids to apparatus and devices which involve up and down or to and fro type reciprocal movement.

2. Description of the Prior Art

Flexible pipe joints as illustrated in FIGS. 4a and 4b have been used in order to enable operations including up and down or to and fro movements, for example, the movement of the press heating plate in the manufacture of fancy plywood used in furniture or desks for business use, which movement is up and down with respect to a raw material plywood (laminated veneer with a synthetic resin plate superimposed thereon) set on the stand of the press machine while supplying steam to the press heating plate, or the movement of the burner in the case of combustion of fuel in boilers of thermal power stations in accordance with changes in demand for electricity, which movement is toward the nozzle while supplying a fuel and steam to the burner and backward leaving the burner while interrupting the supply of the fuel and the like.

More specifically, the known pipe joint includes three swivel joints a, i.e., those arranged on both sides and in the center, and two arm pipes b connecting the three swivel joints to each other. The respective swivel joints a include a stepped cylinder body 1 with a larger diameter portion 1a having an open end and a smaller diameter portion 1b serving as a pipe connection portion for connecting a pipe, the smaller diameter portion 1b of the central swivel joint a being bent substantially at right angles, an elbow pipe 2 having a ball portion 2a with a semispherical surface and with increasing diameter like a funnel shape at one end thereof (lower end in FIG. 4a) and also having a bent portion 2b at another end which is bent substantially at right angles and serving as a pipe connection portion for connecting a pipe, and a cap nut 3 which can be engaged with the larger diameter portion 1a with threads. Inside the larger diameter portion 1a of the cylinder body 1 is inserted the ball portion 2a of the elbow 2 and is fitted snugly using an annular gasket 4 which has an inner surface, arcuate in cross section, permitting contact with the surface of the ball portion 2a. On the other hand, a coil spring 5 and a washer are arranged in a central portion of the larger diameter portion 1a of the cylinder body which urges the elbow 2 outward to cause the spherical surface of the ball portion 2a to be pressed against the arcuate (in cross section) inner surface of the gasket 4, thus airtight sealing the cylinder body 1 and the elbow 2a as well as permitting their rotary and rocking actions.

One arm pipe b is inserted at its ends into the pipe connection portion 2b of the elbow 2 of the swivel joint a on one side (on the left hand side in FIG. 4a) and into the pipe connection portion 2b of the elbow 2 of the swivel joint a, respectively, and welded thereto while another arm pipe b is inserted at its ends into the bent smaller diameter portion 1b of the swivel joint a in the center and into the pipe connection portion 2b of the elbow 2 of the swivel joint on the other side (on the right hand side in FIG. 4a), respectively, and welded thereto. Further, an inlet pipe $P_1$ is attached to the smaller diameter portion 1b of the cylinder body 1 of the swivel joint a on one side to establish fluid communication with a fluid source (not shown) and on the other hand, an outlet pipe $P_2$ is attached to the smaller diameter portion 1b of the cylinder body 1 of the swivel joint a on the other side to connect it to an acting member such as a press plate or a burner. As indicated in dashed line in FIG. 4b, the two pipes b are bent to permit up and down (vertical) or to and fro (horizontal) movement of the acting member while supplying fluid thereto.

While in the above-described conventional pipe joint system, the diameter (D in FIG. 2) of the spherical surface of the ball portion 2a of the elbow 2 of each swivel joint a is made larger than the inner diameter ($d_1$ in FIG. 2) of the upright wall of the gasket 4 and the inner diameter ($d_2$ in FIG. 2) of the edge flange of the cap nut 3 so as to prevent the coming out of the elbow 2 from the cylinder body 1 due to the pressure of the fluid contained in the inside thereof, and therefore, in need of exchanging the gasket 4 because of the wear or deformation thereof, the gasket 4 and the cap nut 3 cannot be withdrawn from the ball portion 2a of the elbow 2 by simply screwing back the cap nut from the cylinder body 1 when the respective swivel joints a are connected with each other by means of the arm pipes b, that is, when in use. Therefore, the portions connecting the elbow 2 to the arm pipe b must be separated from each other before exchanging the gasket 4 with a new one, which is inconvenient. This not only causes decrease in the precision of the size accompanied by fusing and re-welding but also is uneconomical.

SUMMARY OF THE INVENTION

Therefore, it is an object of the present invention to overcome the disadvantage of the conventional flexible joints.

Another object of the present invention is to provide a pipe joint which enables the separation of an elbow from an arm pipe to make it easy to exchange gaskets with new ones without fusing a connection portion for connecting the elbow to the arm pipe.

As a result of intensive investigation, it has now been discovered that the use of a specified adapter can overcome the above-described disadvantages of the conventional pipe joints and achieve the objects of the present invention.

Accordingly, the present invention provides a flexible pipe joint system having a first swivel joint on one side thereof, a second swivel joint on opposite side thereof and a third swivel joint substantially in a center thereof, and a first arm pipe connecting the first and third swivel joints and a second arm pipe connecting the second and third swivel joints, the first, second and third swivel joints each having a stepped cylinder body, an elbow and a cap nut, each stepped cylinder body having a larger diameter portion and a smaller diameter portion, each elbow having on one end thereof a ball portion with a spherical surface and a pipe connection portion on another end thereof, the larger diameter portion of the cylinder body receiving therein the ball portion of the elbow and having fitted therein a gasket which is pressed against the spherical surface of the ball portion rotatably, wherein the pipe connection portion of the elbow of the first swivel joint and the pipe connection portion of the elbow of the second swivel joint each have attached thereto a nipple at its base terminal, the nipple having a flange on its outer end and also having moveably fitted thereto a nut member on its outer periphery, one end of the first arm pipe being connected to the pipe connection portion of the elbow of the third swivel joint and one end of the second arm pipe being connected to the smaller diameter portion of the cylinder body, the other ends of the first and second arm pipes each having attached thereto a short cylindrical adapter having threads on outer surface thereof, the nut member being detachably engaged with the adapter with threads, the adapter and the nut member each having an outer diameter smaller than the inner diameter of the gasket and an inner diameter of an end portion of the cap nut.

The above and other objects, effects, features and advantages of the present invention will become more apparent from the following description of embodiments thereof taken in conjunction with the accompanying drawings.

BRIEF DESCRIPTION OF THE DRAWINGS

FIG. 4a is a partial cross section of the conventional pipe joint system; and

FIG. 4b is a plan view of the conventional pipe joint system illustrated in FIG. 4a.

DESCRIPTION OF PREFERRED EMBODIMENTS

When exchanging the gaskets in the swivel joints on the both sides of the flexible joint system of the present invention, the nut member on the nipple loosened to disconnect it from the adapter. In this state, the cap nut of the swivel joint is loosened to detach it from the larger diameter portion of the cylinder body. Thereafter, the old gasket is taken out together with the cap nut passing around the elbow, the nipple and the nut member. In place thereof, a fresh gasket together with the cap nut is passed around these elements and the gasket is housed in the inside of the cylinder body with which the cap nut is screwed.

The gasket in the central swivel joint is exchanged with a new one by passing the gasket together with the cap nut around the arm pipe.

Referring to the attached drawings, the present invention will be described below in greater detail.

Figure 1:
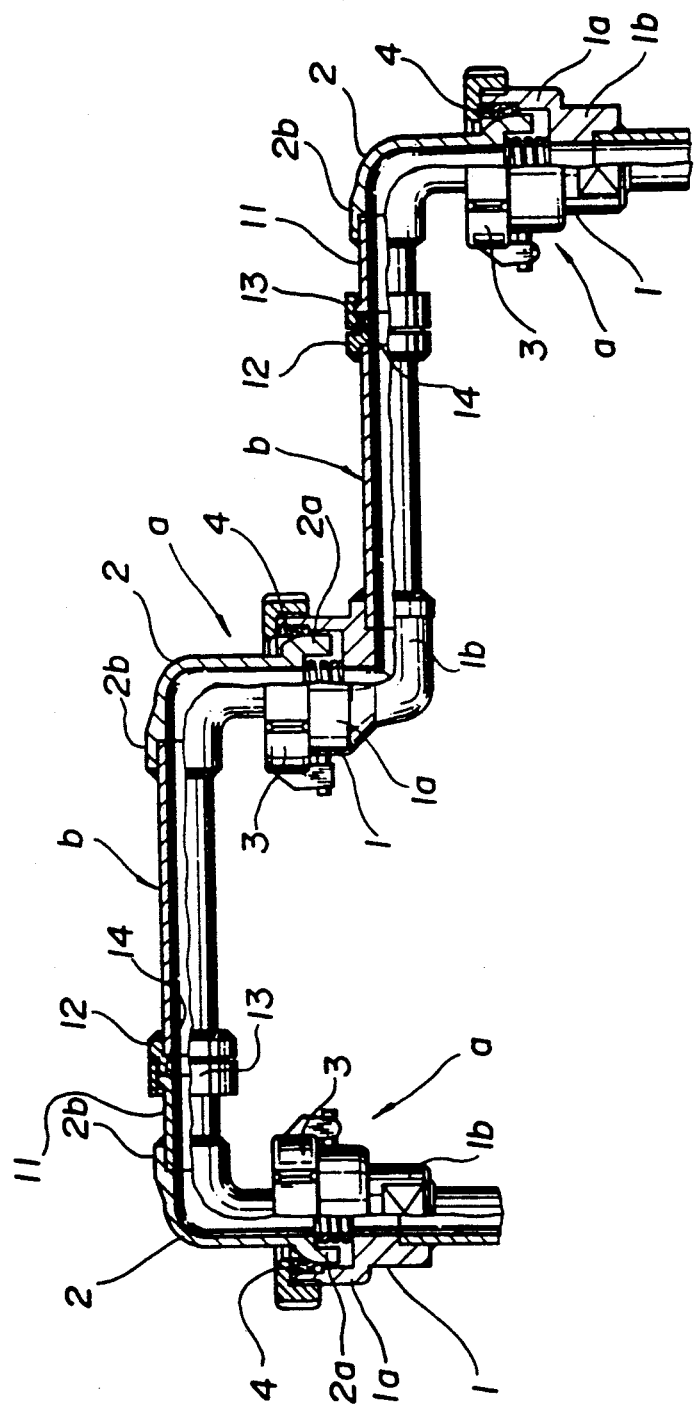
FIG. 1 is a partial cross section of the flexible pipe joint system according to an embodiment of the present invention.
Figure 2:
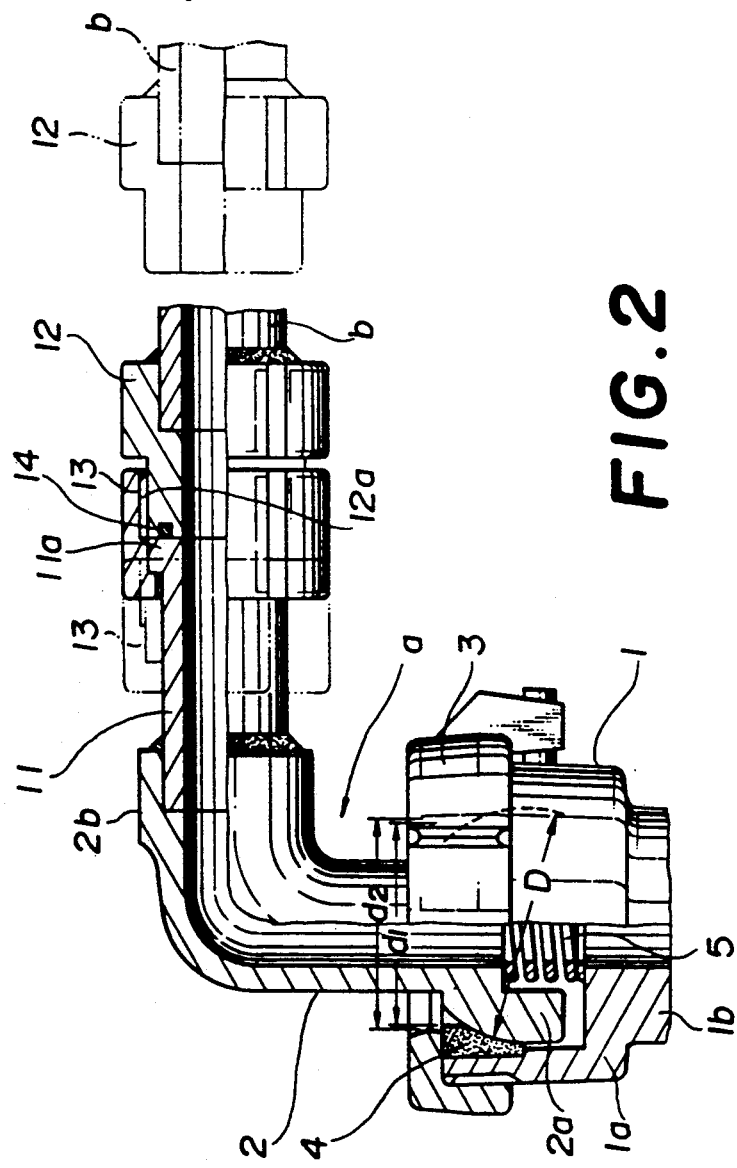
FIG. 2 is a partial cross section of the swivel joint on one side of the flexible pipe joint system of the present invention.

FIGS. 1 and 2 illustrate the flexible pipe joint system of the present invention, whose basic construction is substantially the same as that of the conventional one described above. That is, the flexible pipe joint system of the present invention similarly includes three swivel joints a, i.e., those arranged on both sides (the first and second swivel joints) and in the center (the third swivel joint), and two arm pipes b connecting the three swivel joints to each other (the first arm pipe connecting the first and third swivel joints, and the second arm pipe connecting the second and third arm pipes). The respective swivel joints a include a stepped cylinder body 1 whose larger diameter portion 1a has an open end and whose smaller diameter portion 1b serves as a pipe connection portion for connecting a pipe. The smaller diameter portion 1b of the central swivel joint a is bent substantially at right angles with respect to the larger diameter portion 1a. An elbow pipe 2 has a ball portion 2a with a semispherical surface and an increasing diameter at one end thereof (lower end in FIG. 4a) and also has a bent portion 2b at another end that is bent substantially at right angles with respect to the lower end. The elbow pipe 2 serves as a pipe connection portion for connecting one of the arm pipes b with a cap nut 3 which is threadably engaged with the larger diameter portion 1a of a cylindrical body. The ball portion 2a inserted inside the larger diameter portion 1a of the cylinder body 1 and is fitted snugly with an annular gasket 4, having an inner surface with an arcuate cross section, disposed therebetween. The surface of the ball portion 2a is pressed against the arcuate surface. On the other hand, a coil spring 5 and a washer are arranged in a central portion of the larger diameter portion 1a of the cylinder body which urges the elbow 2 outward. This causes the spherical surface of the ball portion 2a to be pressed against the arcuate (in cross section) inner surface of the gasket 4 so that the ball portion can rotate and rock freely.

One arm pipe b is inserted into the pipe connection portion 2b of the elbow 2 of the swivel joint a on one side (on the left hand side in FIG. 4a) and into the pipe connection portion 2b of the elbow 2 of the swivel joint a, respectively, and welded thereto. Similarly, another arm pipe b is inserted into the bent smaller diameter portion 1b of the swivel joint a in the center and into the pipe connection portion 2b of the elbow of the swivel joint on the other side (on the right hand side in FIG. 4a), respectively, and welded thereto. Further, an inlet pipe $P_1$ is attached to the smaller diameter portion 1b of the cylinder body 1 of the swivel joint a on one side to establish fluid communication with a fluid source (not shown) and on the other hand, an outlet pipe $P_2$ is attached to the smaller diameter portion 1b of the cylinder body 1 of the swivel joint a on the other side to connect it to a mobile acting member such as a press plate or a burner.

In the flexible pipe joint of the present invention, a base terminal of a nipple 11 having a predetermined length is fitted snugly and welded to the pipe connection portion 2a of the elbow 2 of the respective swivel joints a on the both ends thereof. The nipple 11 is of the same diameter as that of the arm pipe b and has, at its end opposing the arm pipe b, a flange 11a and a nut member 13 loosely fitted therearound. An adapter 12 is fitted and welded to an outer end of the arm pipe b connected to the cylinder body 1 and to the swivel joint a positioned substantially in the center, respectively. Each adapter 12 is of a stepped cylindrical shape having a smaller diameter portion and a larger diameter portion. In the end surface of the smaller diameter portion is embedded an O-ring 14. On the other hand, a screw 12 a is provided on the outer surface of the smaller diameter portion. The screw 12a is in threaded engagement with a nut member 13. The O-ring 14 in the adapter 12 contact the end face of the flange 11a of the nipple 11 in a compressed state. Thus, each arm pipe b is connected separably to each nipple 11, that is, the central swivel joint a and and the swivel joints a on the both sides are connected separably through the nipples 11 and arm pipes b.

The outer diameters of the hub member 13 and of the larger diameter portion of the adapter 12 are made smaller than those of the inner diameter $d_2$ of the cap nut 3 and of the inner diameter $d_1$ of the gasket 4 similarly to the case of the outer diameter of the pipe connection portion of the elbow 2.

With the construction as described above, upon use, the swivel joint a connected to the mobile acting member can move closer to and away from the swivel joint a on one side which is connected to the source of fluid, with the central swivel joint a serving as an articulating. During this movement, the desired fluid is supplied from an inlet pipe $P_1$ through the swivel joint a, the nipple 11 and the arm pipe b which are positioned on one side, the central swivel joint a, and the arm pipe b, the nipple 11 and the swivel a which are located on the opposite side, as well as through an outlet pipe $P_2$.

Thus, when the gasket on one side, for example (on the left hand side in FIG. 1) has worn out and deformed with the passage of time and needs to be exchanged with a new one, the nut member 13 on the nipple 11 is screwed back to loosen and disconnect it from the adapter 12 while the adapter 12 together with the arm pipe b is moved backward from the nipple 11.

Then, the cap nut 3 of the swivel joint a is screwed back to loosen and disconnect it from the cylinder body 1 to remove the gasket 4 from the cylinder body 1. Then, the cap nut 3 together with the gasket 4 is dislocated along the elbow 2 toward the pipe connection portion 2b, and passed through the nut member 13 on the nipple 11 to remove the gaskets therefrom. In place of the old gasket, a new gasket 4 is inserted from the side of the nipple 11 and fitted at a predetermined position in the larger diameter portion of the cylinder body 1, and then, the cap nut 3 is screwed into the larger diameter portion 1a of the cylinder body 1 over the newly inserted gasket 4 to press the inner surface of the gasket 4, which is arcuate in cross section, against the spherical surface of the ball portion 2a of the elbow 2. On the other hand, the hub member 13 on the nipple 11 is screwed into the adapter 12 at the tip of the arm pipe b so as to press the O-ring 14 of the adapter 12 against the end surface of the nipple 11 so that the leakage of the fluid therein to the outside can be prevented.

The operation of exchanging the gasket 4 in the swivel joint a on the opposite side can be performed in the same manner as described above. As for the swivel joint a in the center, the attachment and detachment of the gasket 4 and of the cap nut 3 can be performed through the elbow 2, the arm pipe b and the adapter 12.

Figure 3:
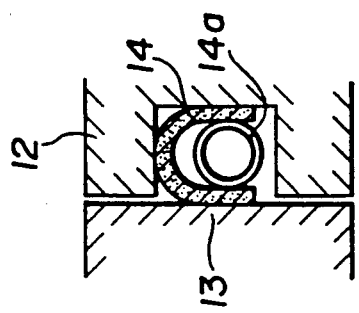
FIG. 3 is a partial cross section of a variation of the O-ring in the adapter used in the flexible pipe joint system of the present invention.

An O-ring 14 is embedded in the end surface of the smaller diameter portion of the adapter 12 made of polytetrafluoroethylene (PTFE) and has a cross section of an inverse U-letter form fitted with a spring material 14a as illustrated in FIG. 3. The O-ring may also be made of an elastic material such as EPR, NBR and fluorine rubber) usually used in the art.

As described above, the flexible pipe joint of the present invention, which includes the nipple and adapter having the above-described special construction and connected to other elements of the pipe joint system the separation and connection of the swivel joints can be performed easily only by screwing or screwing back the nut members of the swivel joints on both sides of the system toward and away from the adapter of the arm pipe integrally formed with the central swivel joint. This can avoid fusing the connection portion between the swivel joints and the arm pipes as required in conventional pipe joints. Therefore, the exchange of gaskets can be carried out in a quick and simple manner speedily. Furthermore, because no fusion techniques are used, the exchange of gaskets can be performed very safely.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A flexible pipe joint system having a first swivel joint on one side thereof, a second swivel joint on opposite side thereof and a third swivel joint substantially in a center thereof, and a first arm pipe connecting the first and third swivel joints and a second arm pipe connecting the second and third swivel joints, said first, second and third swivel joints each having a stepped cylinder body, an elbow and a cap nut, each stepped cylinder body having a larger diameter portion and a smaller diameter portion, each elbow having on one end thereof a ball portion with a spherical surface and a pipe connection portion on another end thereof, said larger diameter portion of the cylinder body receiving therein said ball portion of the elbow and having fitted therein a gasket which is pressed against the spherical surface of the ball portion, said cap nut being threadedly engaged with said large diameter portion of said cylinder body so as to retain said ball portion and said gasket in said large diameter portion, wherein said pipe connection portion of the elbow of said first swivel joint and said pipe connection portion of the elbow of said second swivel joint each having attached thereto a nipple, said nipple having a flange on its outer end and also having moveably fitted thereto a nut member on its outer periphery, one end of said first arm pipe being connected to said pipe connection portion of the elbow of said third swivel joint and one end of said second arm pipe being connected to said smaller diameter portion of said cylinder body of said third swivel joint, the other ends of said first and second arm pipes each having attached thereto a short cylindrical adapter having threads on outer surface thereof, said nut member being detachably threadedly engaged with the adapter, said adapter and said nut member each having an outer diameter smaller than the inner diameter of said gasket and an inner diameter of an end portion of said cap nut such that said gasket can be easily exchanged.

2. The flexible pipe joint system as claimed in claim 1, wherein said system comprises means for applying force to urge said elbow outward so that said spherical surface of the ball portion can be pressed against said inner surface having an arcuate cross section.

3. The flexible pipe joint system as claimed in claim 1, further comprising an inlet pipe adapted to be connected to a fluid source and an outlet pipe adapted to be connected to a mobile acting member.

4. The flexible pipe joint system as claimed in claim 1, wherein said adapter is of a stepped cylindrical form and has a larger diameter portion and a smaller diameter portion, said smaller diameter portion of said adapter having embedded therein an O-ring.

* * * * *